Patented Feb. 6, 1923.

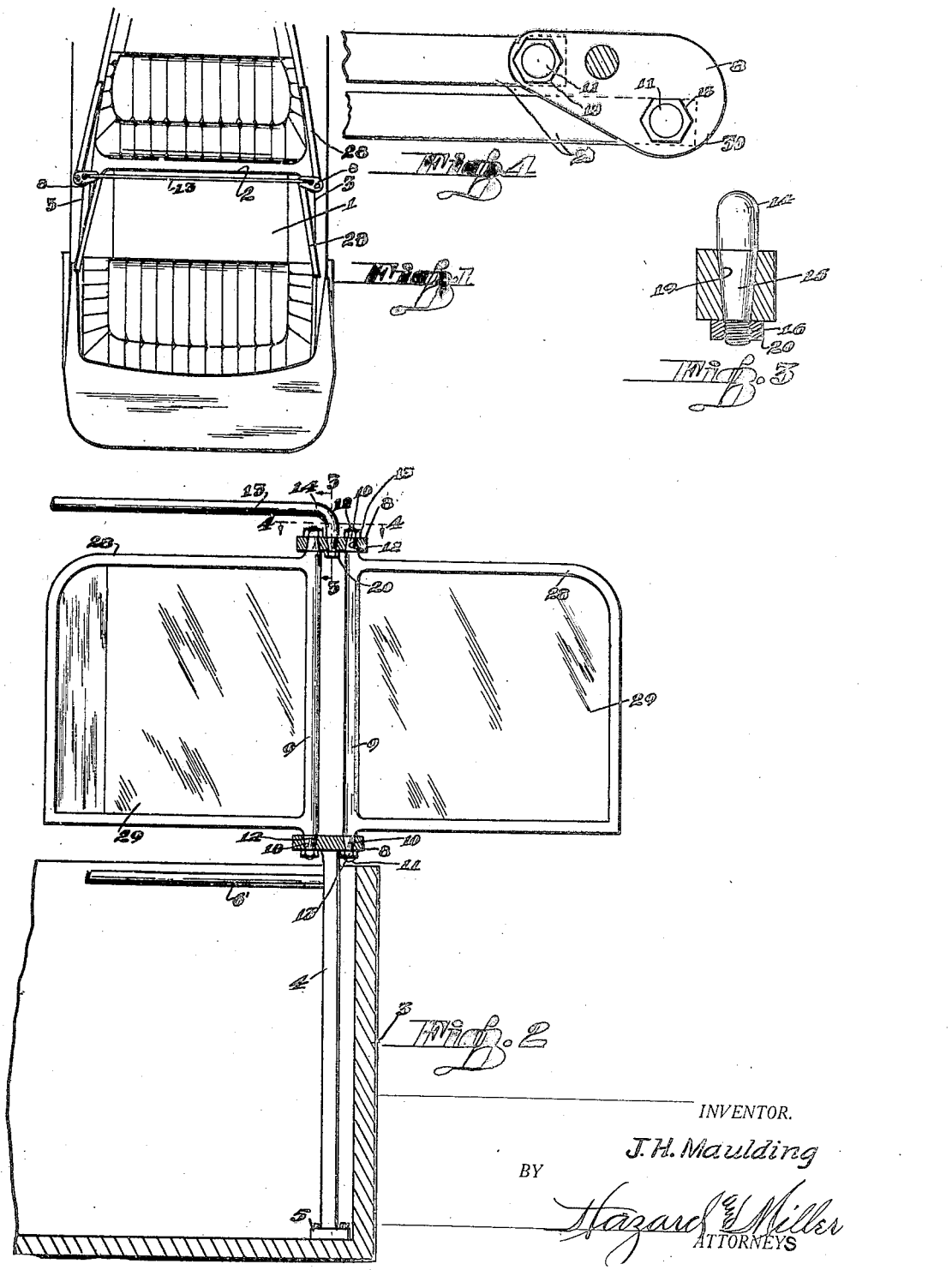

1,444,200

UNITED STATES PATENT OFFICE.

JOHN H. MAULDING, OF LOS ANGELES, CALIFORNIA, ASSIGNOR TO KEET-O-SHIELD MFG. ASSOCIATION, OF SAN ANTONIO, TEXAS.

TONNEAU WINDSHIELD.

Application filed September 3, 1920. Serial No. 407,955.

*To all whom it may concern:*

Be it known that I, JOHN H. MAULDING, a citizen of the United States, residing at Los Angeles, in the county of Los Angeles and State of California, have invented new and useful Improvements in Tonneau Windshields, of which the following is a specification.

This invention relates to tonneau windshields adapted to be mounted at the respective sides of the tonneau of an automobile.

It is the object of the present invention to provide improved mountings for the tonneau wind-shields whereby the wind-shields are braced relative to one another.

It is a still further object of the invention to provide tonneau wind-shields including a plurality of wind deflectors which may be folded within the tonneau of the automobile or extended in opposite direction along side of the automobile body both forwardly and rearwardly from the point of support for the wind-shield.

The invention will be readily understood from the following description of the accompanying drawings, in which Figure 1 is a plan view of an automobile body having the improved tonneau windshield applied thereto.

Fig. 2 is an enlarged transverse section through one side of the tonneau of an automobile showing one of the tonneau windshields.

Figs. 3, and 4 are detail sections on the lines 3—3 and 4—4 of Fig. 2.

In the drawings I have shown a usual automobile body having the tonneau 1 terminating at the back 2 of the front seat. The side walls of the automobile body are shown at 3.

The improved tonneau wind-shields are supported against the back of the front seat at the respective sides of the tonneau and since the construction of the two wind-shields is similar, a description of one of the wind-shields will suffice.

The wind-shield is mounted upon a supporting rod 4 extending upwardly along side the back of the front seat at its junction with the side 3 of the automobile body. This supporting rod may be mounted in a bracket 5 upon the floor of the tonneau. The upper end of the supporting rod extends above the top of the back 2 and a cross rod 6' forming a robe holder preferably connects the supporting rods 4 at the respective sides of the tonneau below the upper ends of the same.

The wind deflectors are supported by transverse bars 8 arranged in spaced relation one above the other and connected by pivot rods 9 which carry the respective wind deflectors. These pivot rods are provided with tapered bearing ends 10 beyond which project threaded portions 11. The tapered bearing ends 10 are received through co-operating tapered bearings 12 provided in the transverse bars 8 and nuts 13 are received upon the threaded ends 11 for securing bars 8 to the pivot rods and adjusting the frictional bearings provided for the pivot rods in the bars 8.

The lower transverse bars 8 of the respective wind-shields are rigidly mounted upon the supporting rods 4 and the upper transverse bars 8 are connected by a cross support 13. The supporting rods 4 extend medially through bars 8 and the cross support 13 is provided with angularly disposed ends 14 also received medially through the bars 8. The ends 14 of the cross support are tapered as shown at 15 and terminate beyond said tapered portions in threaded ends 16. The tapered portions 15 are received through co-operating tapered apertures 19 in bars 8 and nuts 20 are threaded onto the threaded ends 16 for positioning the cross support relative to the bars 8.

The pivot rods 9 each support an outwardly extending frame 28 in which is mounted a usual plate of glass 29 forming a wind deflector. The bars 8 are preferably mounted so as to extend transversely of the automobile body and the deflectors 29 are preferably arranged to be swung upon the pivots provided by rods 9 so that the outer deflector extends forwardly along the line of the side of the automobile body and the inner deflector extends rearwardly along the side of the automobile body. When not in use the inner deflector is swung across the automobile body as shown in Fig. 4 and the outer deflector is swung along side bars 8 and thence across the automobile body. In order to permit the outer deflector to lie close along side bars 8 when thus swung to inoperative position, the bearings for the outer deflectors in bars 8 are preferably offset by means of the lugs 30 as clearly shown in Fig. 4.

Various changes may be made without departing from the spirit of the invention as claimed.

What is claimed is:

1. A tonneau windshield comprising a pair of upright supporting members, a transverse rail connecting the upper portions of said supporting members, a block arranged on the upper end of each supporting member, each block being provided with a pair of bearings, windshields provided on their lower portions with pintles that are arranged for rotation in said bearings, pintles projecting upwardly from said windshields, bearing blocks which receive upwardly projecting pintles, and a transverse rail connecting the last mentioned bearing blocks.

2. In a tonneau windshield, a pair of supports adjacent to the ends of the back of the front seat, a horizontal member on each support, a pair of windshields for each member each having parts at their lower portions pivotally connected to the members, an upper horizontal member for each pair of windshields, the windshields having parts at their upper portions pivotally connected to the upper members, a transverse rail connecting the upper members, and means to adjustably secure each windshield of each pair to the respective members without disturbing the adjustment of the other windshield of the pair.

3. In a tonneau windshield, a pair of supports adjacent to the ends of the back of the front seat, a horizontal member on each support, a pair of windshields for each member each having parts at their lower portions pivotally connected to the members, an upper horizontal member for each pair of windshields, the windshields having parts at their upper portions pivotally connected to the upper members, and a transverse rail extending between the upper members and above the latter and above the windshields and having its ends extended downwardly and projecting through and secured to the upper members.

4. In a tonneau windshield, a pair of supports adjacent to the ends of the back of the front seat, a horizontal member on each support, a pair of windshields for each member, an upper horizontal member for each pair of windshields each having an offset at its outer end, and a connecting rod secured at its ends to the upper members, each pair of windshields having upper and lower parts independently and pivotally connected to the inner ends and offset outer ends respectively of the upper and lower members.

5. In a tonneau windshield, a pair of spaced windshields each having upper and lower parts, upper and lower supporting members connected to the respective upper and lower parts of the windshields so as to hold the latter in spaced relation and to afford an independent mounting for each windshield, means connecting the upper members, means to rigidly mount the lower members in the tonneau, and means to independently and adjustably secure each windshield to its supporting members so as to allow of adjustment of either windshield without disturbing the other.

In testimony whereof I have signed my name to this specification.

JOHN H. MAULDING.